(12) United States Patent　　(10) Patent No.: US 10,462,502 B2
Tsukagoshi　　(45) Date of Patent: Oct. 29, 2019

(54) TRANSMITTING APPARATUS, TRANSMITTING METHOD, RECEIVING APPARATUS, AND RECEIVING METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 43 days.

(21) Appl. No.: 15/514,718

(22) PCT Filed: Nov. 9, 2015

(86) PCT No.: PCT/JP2015/081519
§ 371 (c)(1),
(2) Date: Mar. 27, 2017

(87) PCT Pub. No.: WO2016/080234
PCT Pub. Date: May 26, 2016

(65) Prior Publication Data
US 2017/0238023 A1　　Aug. 17, 2017

(30) Foreign Application Priority Data
Nov. 21, 2014　(JP) .................................. 2014-236650

(51) Int. Cl.
*H04N 21/236*　　(2011.01)
*H04L 1/00*　　(2006.01)
(Continued)

(52) U.S. Cl.
CPC ......... *H04N 21/236* (2013.01); *H04L 1/0009* (2013.01); *H04L 65/4076* (2013.01);
(Continued)

(58) Field of Classification Search
CPC ............... H04N 21/236; H04N 21/238; H04N 21/2383; H04L 65/4069; H04L 65/4076;
(Continued)

(56) References Cited

U.S. PATENT DOCUMENTS 8,959,554 B2 *　2/2015　Hwang ............. H04N 21/6131
725/109
2003/0002495 A1 *　1/2003　Shahar ................. H04L 1/0003
370/389
(Continued)

FOREIGN PATENT DOCUMENTS

JP　　2012-15875 A　　1/2012
JP　　2016-48912 A　　4/2016

OTHER PUBLICATIONS

Aoki et al., "Efficient Multiplexing Scheme for IP packets over the Advanced Satellite Broadcasting System", NHK Science and Technical Research Laboratories R&D Report, No. 119, (Jan. 15, 2010), (with an English Abstract and Translation 36 pages).
(Continued)

*Primary Examiner* — James R Sheleheda
(74) *Attorney, Agent, or Firm* — Oblon, McClelland, Maier & Neustadt, L.L.P.

(57) ABSTRACT

Selective processing of media data is facilitated on a receiving side.
A transmission stream in which transmission packets are consecutively disposed is transmitted. Each transmission packet includes a multiplexed transport packet having media data in an upper layer. Identification information representing a kind of media data included in the transmission packet is inserted into the transmission packet. The transmission packet including desired media data is easily recognized and selectively processed on a receiving side.

15 Claims, 13 Drawing Sheets

(51) Int. Cl.
*H04N 21/239* (2011.01)
*H04L 29/06* (2006.01)

(52) U.S. Cl.
CPC ........ *H04L 65/4084* (2013.01); *H04L 65/607* (2013.01); *H04N 21/2393* (2013.01); *H04L 65/608* (2013.01); *H04L 2212/00* (2013.01)

(58) Field of Classification Search
CPC . H04L 65/4084; H04L 65/607; H04L 65/608; H04L 2212/00; H04L 1/0009
See application file for complete search history.

(56) References Cited

U.S. PATENT DOCUMENTS

| | | | | |
|---|---|---|---|---|
| 2008/0045217 | A1* | 2/2008 | Kojima | H04W 36/0011 455/436 |
| 2008/0049597 | A1* | 2/2008 | Walker | H04L 1/00 370/204 |
| 2011/0103300 | A1* | 5/2011 | Vare | H04N 21/6112 370/328 |
| 2013/0039278 | A1* | 2/2013 | Bouazizi | H04L 65/4076 370/328 |
| 2013/0094518 | A1* | 4/2013 | Bae | H04L 65/607 370/474 |
| 2013/0291027 | A1* | 10/2013 | Hwang | H04N 21/6131 725/62 |
| 2014/0064280 | A1 | 3/2014 | Qin et al. | |
| 2014/0313916 | A1* | 10/2014 | Hwang | H04N 21/236 370/252 |
| 2014/0317674 | A1* | 10/2014 | Hwang | H04N 21/631 725/118 |
| 2014/0379903 | A1* | 12/2014 | Bouazizi | H04L 29/06027 709/224 |
| 2015/0020138 | A1* | 1/2015 | Bae | H04N 21/2343 725/116 |
| 2015/0063357 | A1* | 3/2015 | Hwang | H04L 5/0044 370/392 |
| 2015/0095965 | A1* | 4/2015 | Yang | H04L 1/0057 725/116 |
| 2015/0304693 | A1* | 10/2015 | Hwang | H04N 21/2662 725/116 |
| 2015/0358651 | A1* | 12/2015 | Hwang | H04N 21/2362 725/54 |
| 2016/0057489 | A1* | 2/2016 | He | H04N 21/4424 725/14 |
| 2016/0088321 | A1* | 3/2016 | Tsukagoshi | H04N 21/2387 725/25 |
| 2016/0094687 | A1* | 3/2016 | Kwon | H04N 21/6332 370/474 |
| 2016/0112731 | A1* | 4/2016 | Tsukagoshi | H04N 21/236 725/109 |
| 2017/0142453 | A1* | 5/2017 | Kitazato | H04N 21/23614 |
| 2017/0155947 | A1* | 6/2017 | Iguchi | H04N 21/434 |
| 2017/0163710 | A1* | 6/2017 | Iguchi | H04L 65/607 |
| 2017/0188063 | A1* | 6/2017 | Takahashi | H04H 20/42 |
| 2017/0238023 | A1* | 8/2017 | Tsukagoshi | H04N 21/236 725/116 |
| 2017/0310530 | A1* | 10/2017 | Kobatake | H04L 5/0044 |

OTHER PUBLICATIONS

Shuichi Aoki, et al., "Efficient Multiplexing Scheme for IP packets over the Advanced Satellite Broadcasting System", NHK Science Technology Research Laboratories R&D, NHK Publishing, Inc., No. 119, Jan. 15, 2010, pp. 49-59 (with English Abstract).
"Broadcast System using Multilayer Profile (Scalable Profile)", Total Multimedia Library, MPEG, vol. 1, Issue 4, Jul. 20, 1998, pp. 203-204 (with partial English-language translation).

* cited by examiner

TRANSMISSION PROTOCOL STACK

FIG. 5

| type | priority | transport media |
|---|---|---|
| Packet type1 | 0 | Video 1 (HD) + Audio 1 (CONVENTIONAL SOUND QUALITY) |
| Packet type2 | 1 | Video 2 (UHD) + Audio 2 (HIGH SOUND QUALITY) |
| Packet type3 | 2 | Video 3 (SCALABLE EXTENSION COMPONENT OF HD) + Audio 2 (HIGH SOUND QUALITY) |
| Packet type4 | 3 | Video 3 (SCALABLE EXTENSION COMPONENT OF HD) + Audio 3 (SCALABLE EXTENSION COMPONENT FROM CONVENTIONAL SOUND QUALITY) |
| Packet type5 | 4 | Video 3 (SCALABLE EXTENSION COMPONENT OF HD) |
| Packet type6 | 5 | Audio 2 (HIGH SOUND QUALITY) |
| Packet type7 | 6 | Audio 3 (SCALABLE EXTENSION COMPONENT FROM CONVENTIONAL QUALITY) |

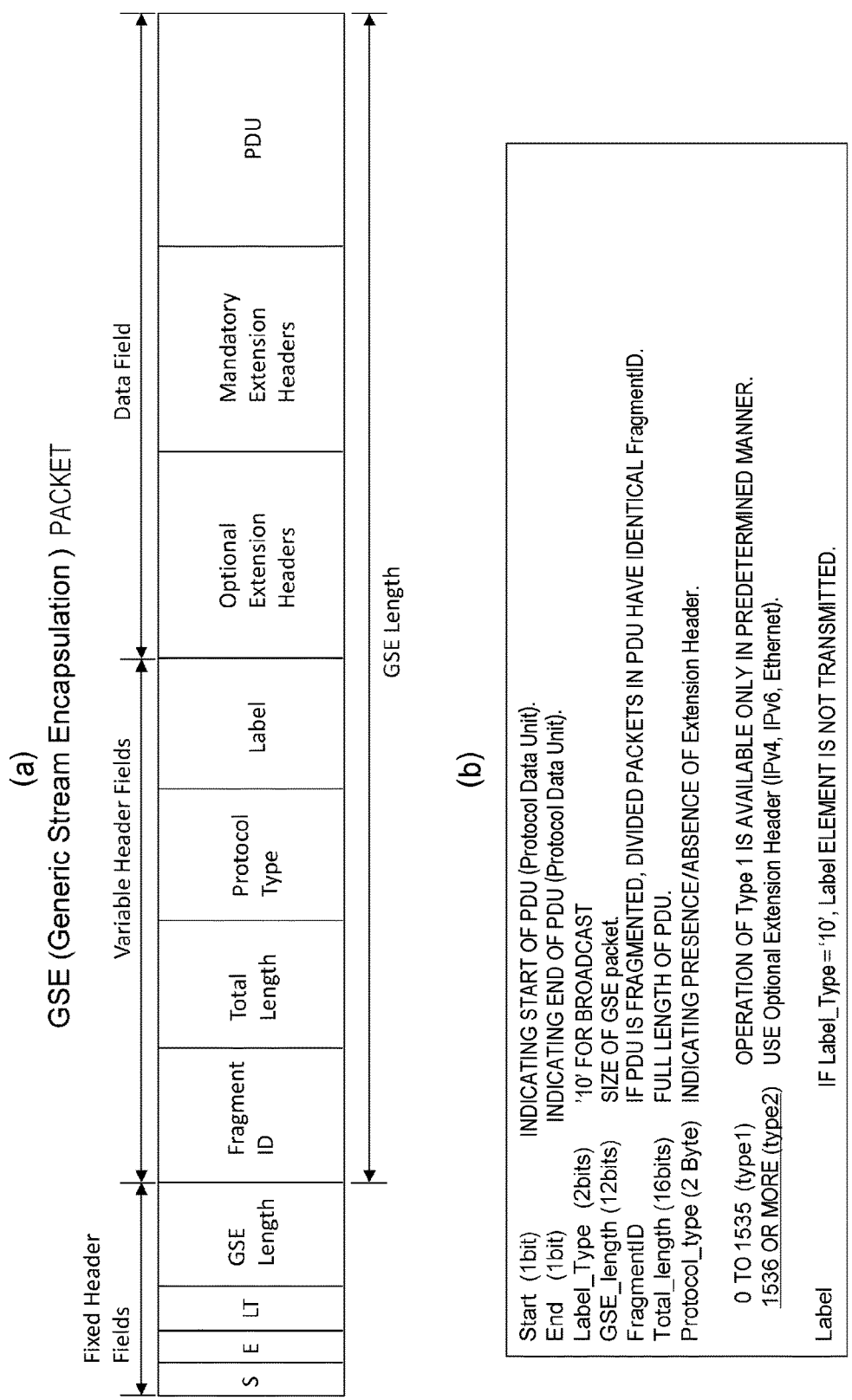

FIG. 7

| Syntax | No. of Bits | Format |
|---|---|---|
| Optional_extension_headers { | | |
|     extension_header_type | 8 | uimsbf |
|     extension_header_length | 8 | uimsbf |
|     packet_priorities | 8 | uimsbf |
| } | | |

FIG. 8

| syntax | no. of Bits | format |
|---|---|---|
| TLV_packet{ | | |
|     '01' | 2 | bslbf |
|     packet_priorities | 6 | uimsbf |
|     packet_type | 8 | bslbf |
|     length | 16 | uimsbf |
|     if (packet_type==0x01) | | uimslbf |
|         IPv4_packet ( ) | | |
|     else if (packet_type==0x02) | | |
|         IPv6_packet ( ) | | |
|     else if (packet_type==0x03) | | |
|         compressed_ip_packet( ) | | |
|     else if (packet_type==0xFE) | | |
|         signalling_packet ( ) | | |
|     else if (packet_type==0xFF){ | | |
|         for(i=0;i<N;i++){ | | |
|             NULL | 8 | bslbf |
|         } | | |
|     } | | |
| } | | |

FIG. 9
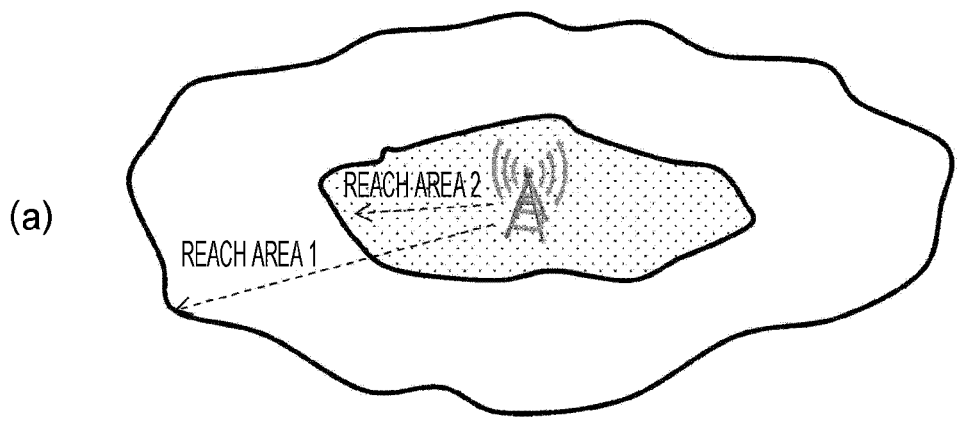
(a)
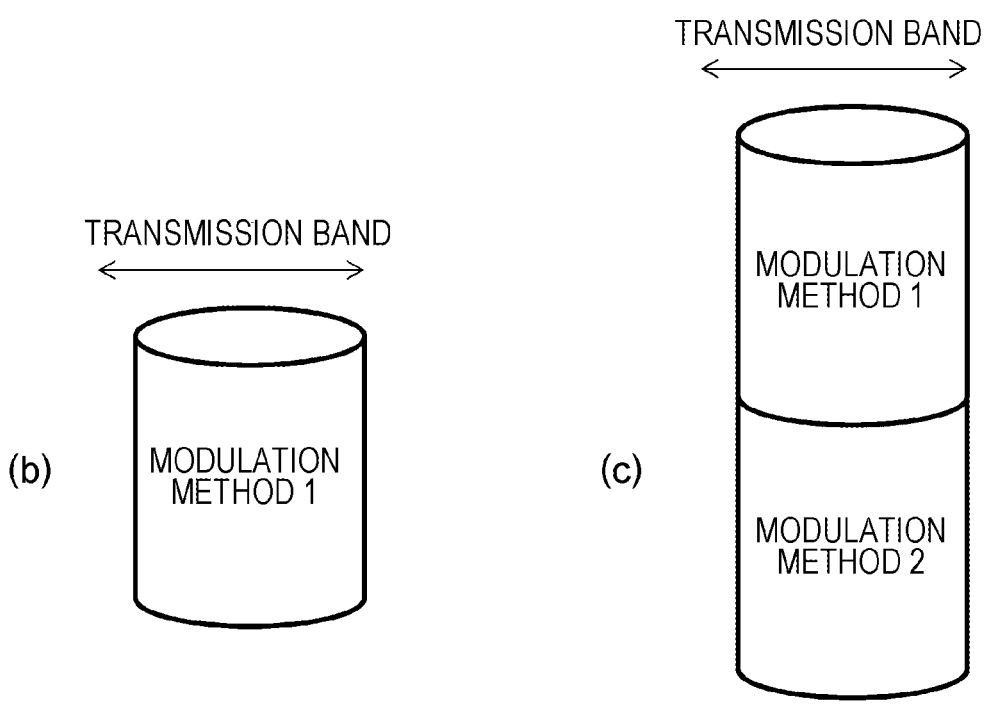
(b)
(c)

FIG. 10

| MODULATION TYPE | | EXAMPLE COMBINATION OF PACKET TYPE | | | | | |
|---|---|---|---|---|---|---|---|
| m1 | m2 | c1 | c2 | c3 | c4 | c5 | c6 |
| MODULATION METHOD 1 | MODULATION METHOD 1 (LONG-DISTANCE ROBUST TRANSMISSION IS AVAILABLE) | Pt1 | Pt1 | Pt1 | Pt1 | Pt1 Pt6 | Pt1 Pt6 |
| | MODULATION METHOD 2 (MIDDLE-DISTANCE ROBUST TRANSMISSION IS AVAILABLE) | Pt2 | Pt3 | Pt4 | Pt5 Pt6 | Pt5 | Pt7 |

EXAMPLE PACKET SELECTION OPERATION IN RECEIVING TERMINAL

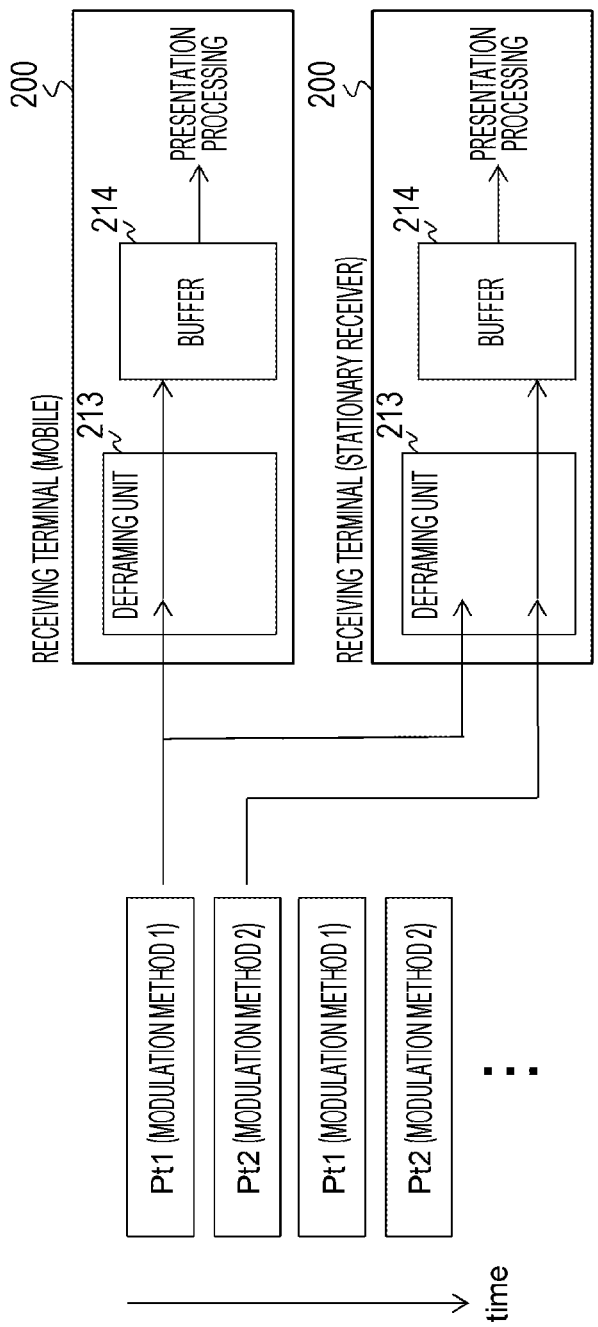

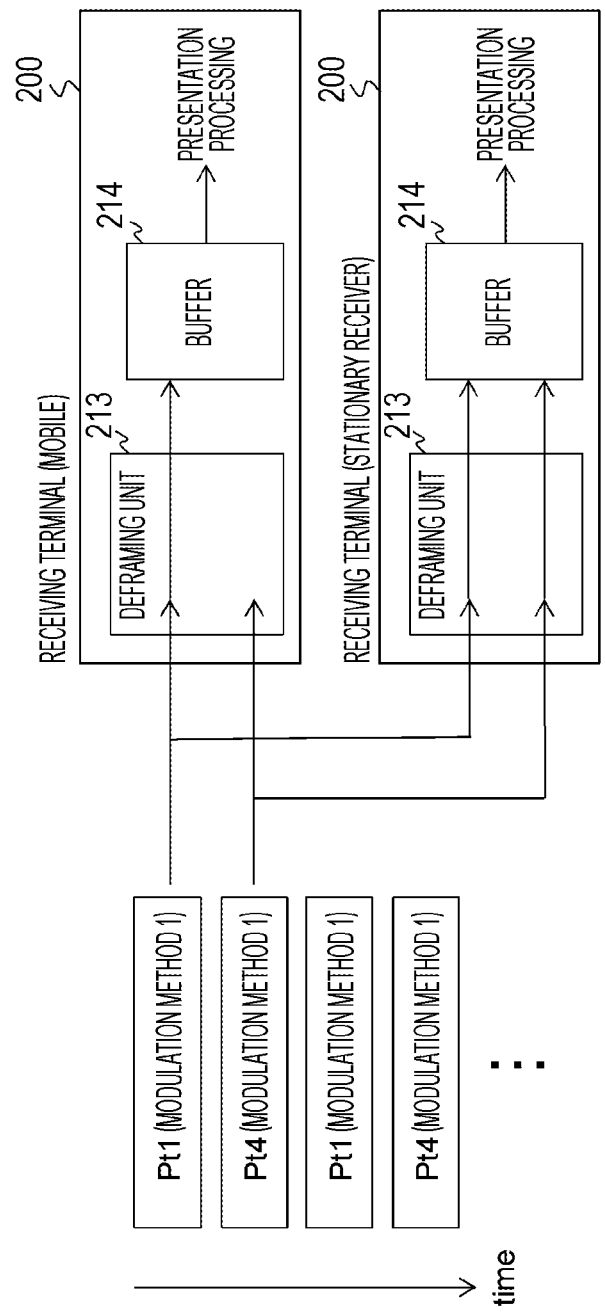

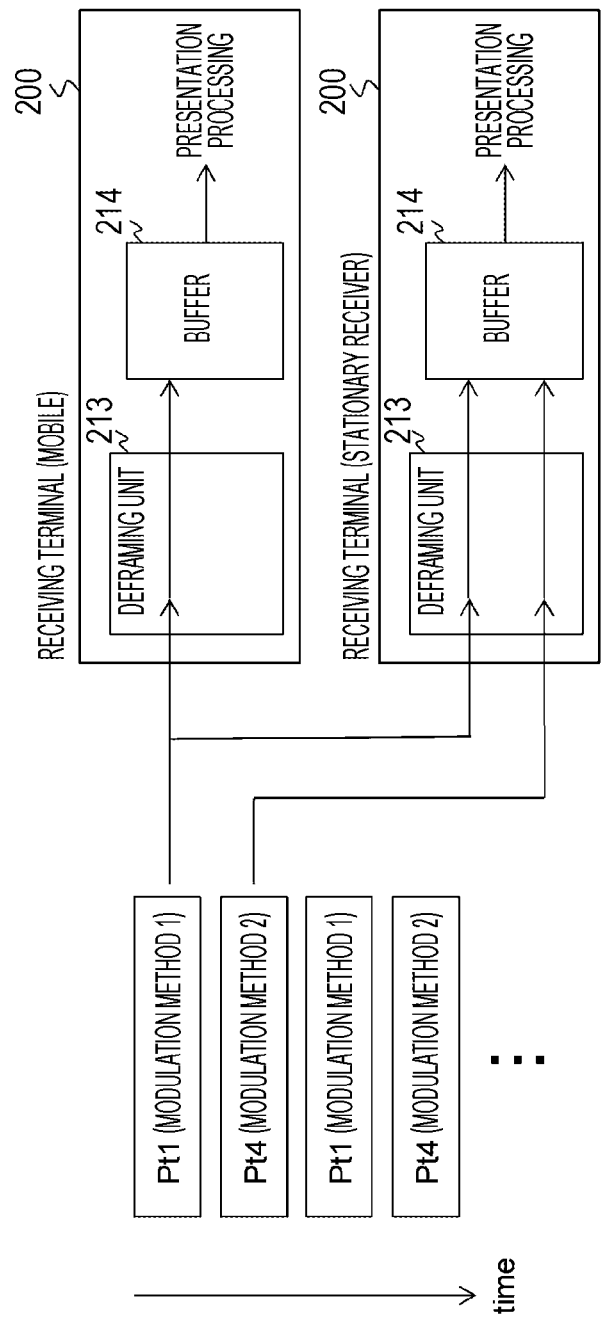

TRANSMITTING APPARATUS, TRANSMITTING METHOD, RECEIVING APPARATUS, AND RECEIVING METHOD

TECHNICAL FIELD

The present technology relates to transmitting apparatuses, transmitting methods, receiving apparatuses, and receiving methods. More particularly, the present technology relates to a transmitting apparatus and the like for transmitting a transmission stream in which transmission packets are consecutively disposed.

BACKGROUND ART

In a case where a service stream is supplied on the IP packet, an encapsulated layer may be provided as an interface between a physical layer in which a transmission path is modulated and an IP packet layer in which data is packetized (e.g., see Patent Document 1).

CITATION LIST

Patent Document

Patent Document 1: Japanese Patent Application Laid-Open No. 2012-015875

SUMMARY OF THE INVENTION

Problems to be Solved by the Invention

It has been considered to use an encapsulated layer for transmitting the IP packet on the broadcast wave by putting a packet of broadcast wave services on the IP packet. In this case, a packet of the encapsulated layer includes a multiplexed transport packet that includes media data in an upper layer. At this time, more than one kind of media data may be transmitted in a time-division manner.

It is an object of the present technology to facilitate selective processing of media data on a receiving side.

Solutions to Problems

A concept of the present technology lies in a transmitting apparatus including a transmitting unit that transmits a transmission stream in which transmission packets are consecutively disposed, each transmission packet including a multiplexed transport packet having media data in an upper layer, and an information inserting unit that inserts identification information into the transmission packet, the identification information representing a kind of the media data included in the transmission packet.

In the present technology, the transmitting unit transmits the transmission stream in which transmission packets are consecutively disposed, each transmission packet including a multiplexed transport packet having media data in an upper layer. For example, the transmission packet may be a packet of an encapsulated layer obtained by encapsulating the IP packet that includes the multiplexed transport packet in its payload. In this case, the transmission packet may be a GSE packet or a TLV packet. The information inserting unit inserts identification information into the transmission packet, the identification information representing the kind of media data included in the transmission packet.

Thus, the identification information representing the kind of media data included in the transmission packet is inserted into the transmission packet in the present technology. On the receiving side, therefore, the transmission packet including desired media data can be recognized easily, and selective processing of the media data is facilitated.

In the present technology, it is noted that the transmitting unit may transmit the transmission packets disposed consecutively by modulating the transmission packets by, for example, a plurality of modulation methods. In this case, different kinds of media data may be included in the transmission packets modulated by different modulation methods. Thus, the modulation method of the individual transmission packets can be changed according to the kind of media data.

In addition, another concept of the present technology lies in a receiving apparatus including a receiving unit that receives a transmission stream in which transmission packets are consecutively disposed, each transmission packet including a multiplexed transport packet having media data in an upper layer. In the transmission packets, identification information representing a kind of media data included in the transmission packet is inserted. The receiving apparatus further includes a processing unit that processes the received transmission stream in accordance with the identification information.

In the present technology, the receiving unit receives a transmission stream in which transmission packets are disposed consecutively, each transmission packet having a container including media information in an upper layer. The identification information representing the kind of media data included in the transmission packet is inserted into the transmission packet. For example, the transmission packet may be a packet of an encapsulated layer obtained by encapsulating the IP packet that includes the multiplexed transport packet in its payload. In this case, the transmission packet may be a TLV packet or a GSE packet.

The processing unit processes the received transmission stream with the identification information. For example, the processing unit may process a transmission packet among the transmission packets included in the received transmission stream by selectively taking payload data of the transmission packet in the buffer, the transmission packet including the identification information representing the kind of predetermined media data inserted to the transmission packet.

Thus, the present technology processes the transmission stream, in which the transmission packets are consecutively disposed, in accordance with the identification information inserted in each transmission packet, the identification information representing the kind of media data included in each transmission packet. In this case, a transmission packet including desired media data can easily be recognized, and selective processing of media data is facilitated.

Effects of the Invention

The present technology facilitates selective processing of media data on the receiving side. It is noted that the present specification describes only an example effect not in a limiting manner, so that an additional effect may also be provided.

BRIEF DESCRIPTION OF DRAWINGS

FIG. 5 illustrates an example kind of media data included in a packet of an encapsulated layer.

FIG. 6(a) illustrates an example structure of a GSE packet, and FIG. 6(b) illustrates contents of main items in the example structure.

FIG. 7 illustrates an example structure of an optional extension header to which a priority value is inserted.

FIG. 8 illustrates an example structure of a TLV packet.

FIGS. 9(a) to 9(c) are explanatory views for explaining the number and kinds of modulation methods for modulating the packet of the encapsulated layer.

FIG. 10 illustrates example combinations of types of packet to be transmitted and example types of modulation.

FIG. 13 is an explanatory view for explaining an example of packet selective operation in a receiving terminal (combination: c1, modulation method: 2).

FIG. 14 is an explanatory view for explaining an example of packet selective operation in a receiving terminal (combination: c3, modulation method: 1).

FIG. 15 is an explanatory view for explaining an example of packet selective operation in a receiving terminal (combination: c3, modulation method: 2).

MODE FOR CARRYING OUT THE INVENTION

An embodiment for implementing an invention (referred to as an embodiment hereinafter) will be described below. It is noted that the description will be provided in the following order.
1. Embodiment
2. Modification 1. Embodiment

[Example Configuration of Transmission and Reception System]

Figure 1:
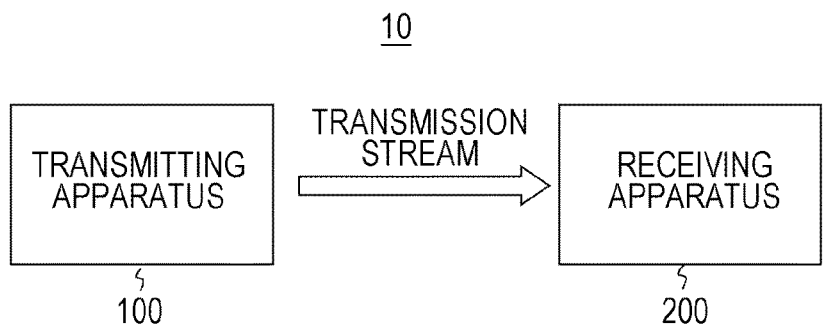
FIG. 1 is a block diagram illustrating an example configuration of an embodiment of a transmission and reception system.

FIG. 1 illustrates an example configuration of an embodiment of a transmission and reception system 10. The transmission and reception system 10 includes a transmitting apparatus 100 and a receiving apparatus 200.

The transmitting apparatus 100 transmits a transmission stream to a receiving side through an RF transmission path by putting the transmission stream on a broadcast wave, the transmission stream including transmission packets that are consecutively disposed, each transmission packet including a multiplexed transport packet having media data in an upper layer. As used herein, the multiplexed transport packet is an MMT packet or an RTP packet, or an ISO base media file format (ISOBMFF) packet which is referred to as MP4, or a TS packet.

In the present embodiment, the transmission packet is a packet of an encapsulated layer obtained by encapsulating an IP packet that includes a multiplexed transport packet in its payload. The packet of the encapsulated layer is, for example, a generic stream encapsulation (GSE) packet, a types-length-value (TLV) packet, or the like.

In the present embodiment, each packet of the encapsulated layer includes identification information inserted into the packet of the encapsulated layer, the identification information representing a kind of media data included in the packet of the encapsulated layer. Further, in the present embodiment, each packet of the encapsulated layer is transmitted after modulation using one or a plurality of modulation methods.

The receiving apparatus 200 receives the transmission stream put on the broadcast wave from the transmitting apparatus 100. The transmission stream includes the above-described consecutively-disposed packets of the encapsulated layer. The identification information representing the kind of media data included in the packet of the encapsulated layer is inserted into the packet of the encapsulated layer.

As described above, each packet of the encapsulated layer is transmitted after modulation using one or a plurality of modulation methods. The receiving apparatus 200 only obtains a transmission packet by demodulating the transmission packet that has been modulated by the modulation method capable of being handled by the receiving apparatus 200.

The receiving apparatus 200 processes the received transmission stream in accordance with the identification information inserted in each packet of the encapsulated layer. For example, payload data of the packet of the encapsulated layer, to which the identification information representing a desired kind of media data has been inserted, among the packets of the encapsulated layer included in the received transmission stream is selectively put in a buffer and processed to decode and present images and voice.

Figure 2:
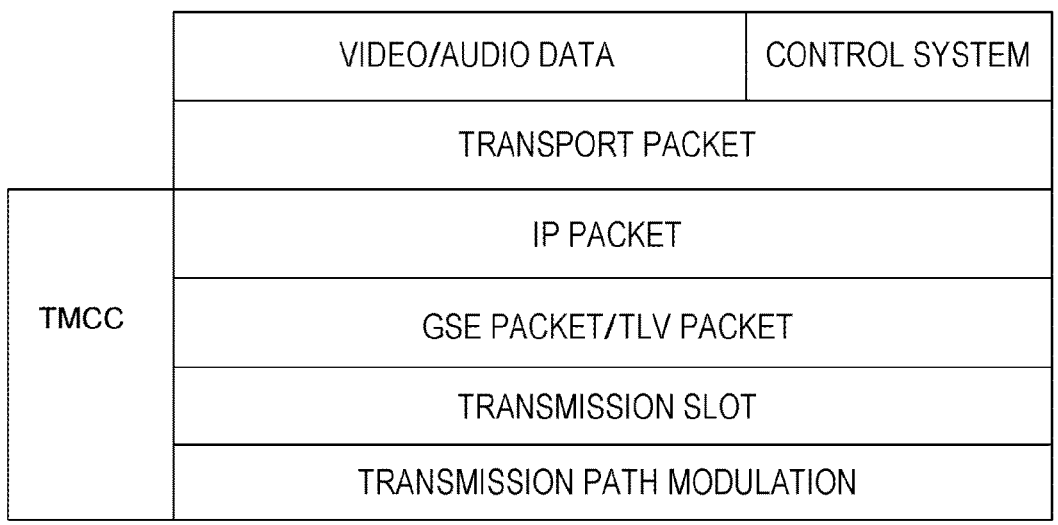
FIG. 2 illustrates a transmission protocol stack.

FIG. 2 illustrates a transmission protocol stack. A transmission path modulation layer is disposed in the bottom.

A transmission slot is provided on the transmission path modulation layer. A packet of the encapsulated layer, such as the GSE packet or the TLV packet, is provided in the transmission slots. The IP packet is disposed on the packet of the encapsulated layer. Then, a multiplexed transport packet that includes media data, such as video or audio data, or control data, is disposed in a container layer on the IP packet via a UDP packet or a TCP packet not illustrated.

Furthermore, a maximum of 120 transmission slots are included in a transmission frame depending on the modulation method. Pointer information representing from which byte of each slot multiplexing of the packet starts is transmitted in a transmission and multiplexing configuration control (TMCC) signal.

Figure 3:
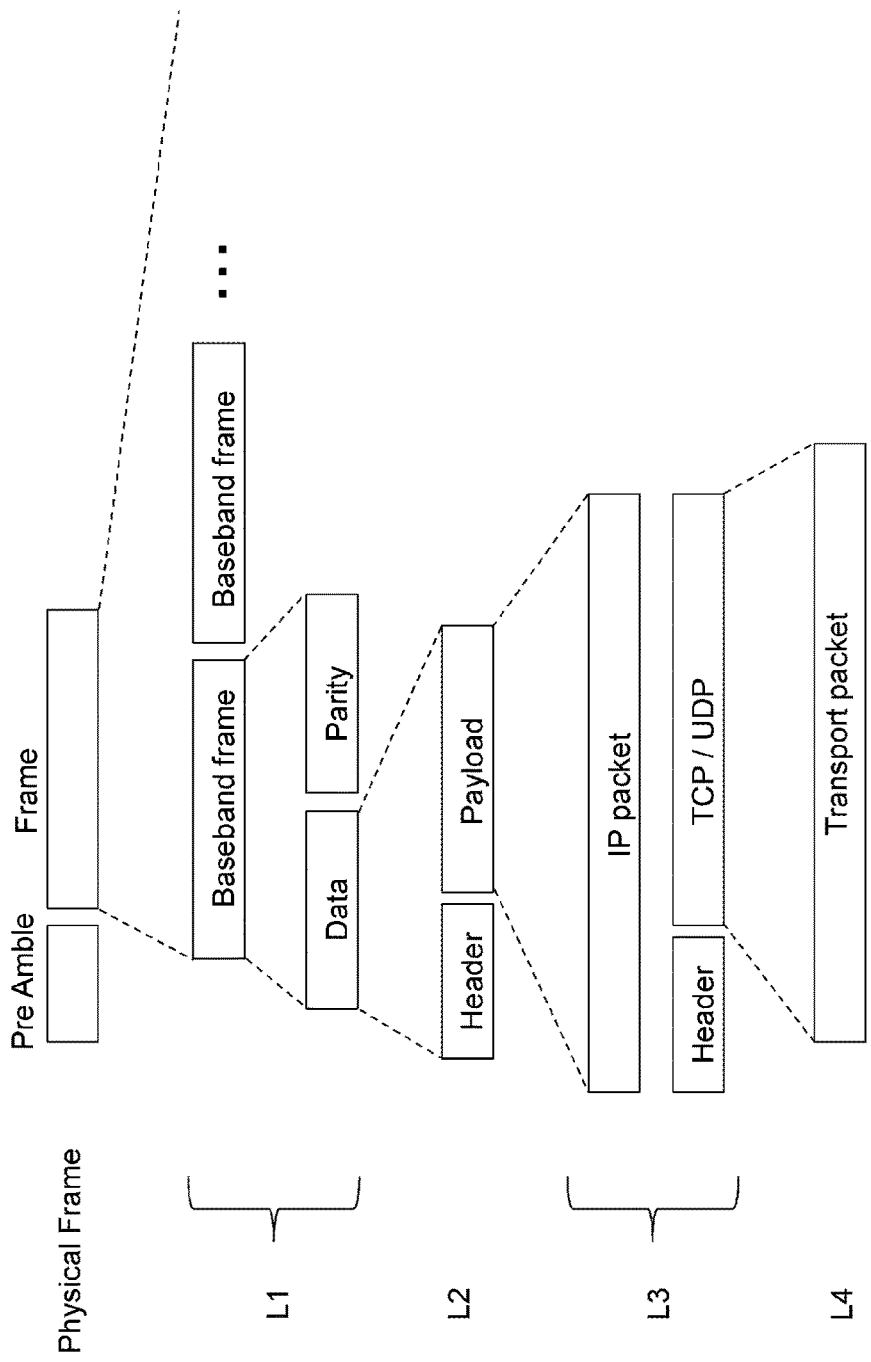
FIG. 3 is a schematic view of a packet configuration of the transmission protocol stack.

FIG. 3 is a schematic view of a packet configuration of the transmission protocol stack. In a physical frame, a preamble is present at the head of the frame which is followed by a frame. In the frame, baseband frames are consecutively disposed in a first layer "L1". At this time, the baseband frames are interleaved and modulated at a predetermined encoding ratio. One or a plurality of modulation methods is used as the modulation method in the present embodiment, as described above.

The baseband frames in the first layer "L1" are each configured to add a parity for error check to data. A packet of a second layer "L2" or the encapsulated layer is allocated to the data in the first layer "L1". The packet of the encapsulated layer includes a header and payload.

An IP packet of a third layer "L3" is allocated to the payload of the packet of the encapsulated layer. The IP packet includes a header and payload that includes a TCP packet or a UDP packet. A multiplexed transport packet of a fourth layer "L4" or a container layer is allocated to the payload of the TCP packet or the UDP packet.

[Example Configuration of Transmitting Apparatus]

Figure 4:
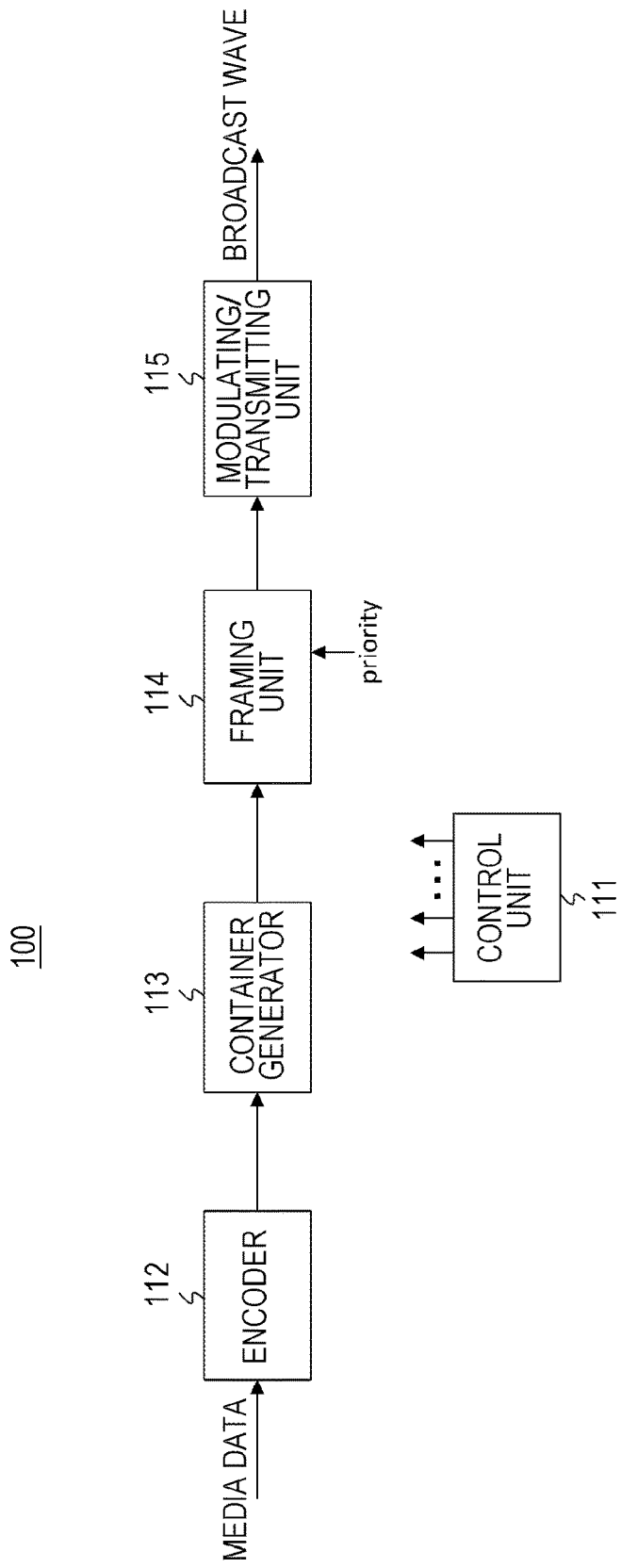
FIG. 4 is a block diagram illustrating an example configuration of a transmitting apparatus.

FIG. 4 illustrates an example configuration of the transmitting apparatus 100. The transmitting apparatus 100 includes a control unit 111, an encoder 112, a container generator 113, a framing unit 114, and a modulating/transmitting unit 115. The control unit 111 controls operation of constituent components of the transmitting apparatus 100. The encoder 112 obtains encoded data by encoding the media data, such as video or audio data.

Further, the container generator 113 generates a multiplexed transport packet for each kind of media by packetizing the encoded data obtained in the encoder 112. The multiplexed transport packet is, for example, an MMT packet, an RTP packet, an ISO base media file format (ISOBMFF) packet which is referred to as MP4, or a TS packet.

The framing unit 114 packetizes the multiplexed transport packet into the UDP packet or the TCP packet, and further adds an IP header to generate the IP packet including the multiplexed transport packet. Further, the framing unit 114 encapsulates the IP packet to generate a packet of the encapsulated layer, such as the GSE packet or the TLV packet.

Meanwhile, the framing unit 114 inserts, into the packet of the encapsulated layer, the identification information representing the kind of media data included in the packet of the encapsulated layer. In the present embodiment, a priority value is inserted as the identification information.

FIG. 5 illustrates example kinds of media data included in the packet of the encapsulated layer. A kind of media data identified by priority "0" is defined as including video data 1 (Video1) having HD resolution and audio data 1 (Audio1) having conventional sound quality. In addition, a type of the packet of the encapsulated layer including this kind of media data is regarded as a packet type 1.

Further, a kind of the media data identified by priority "1" is defined as including video data 2 (Video2) having a UHD resolution and audio data 2 (Audio2) having a high sound quality. In addition, a type of the packet of the encapsulated layer including this kind of media data is regarded as a packet type 2. As used herein, the high sound quality includes, for example, higher bit rates or larger number of channels.

Further, a kind of the media data identified by priority "2" is defined as including video data 3 (Video3) including HD scalable extension components and audio data 2 (Audio2) having a high sound quality. In addition, a type of the packet of the encapsulated layer including this kind of media data is regarded as a packet type 3.

Further, a kind of the media data identified by priority "3" is defined as including video data 3 (Video3) including HD scalable extension components and audio data 3 (Audio3) having scalable extension components from conventional sound quality. In addition, a type of the packet of the encapsulated layer including this kind of media data is regarded as a packet type 4.

Further, a kind of the media data identified by priority "4" is defined as only including video data 3 (Video3) including HD scalable extension components. In addition, a type of the packet of the encapsulated layer including this kind of media data is regarded as a packet type 5.

Further, a kind of the media data identified by priority "5" is defined as including only audio data 2 (Audio2) having high sound quality. In addition, a type of the packet of the encapsulated layer including this kind of media data is regarded as a packet type 6.

Further, a kind of the media data identified by priority "6" is defined as including only audio data 3 (Audio3) having scalable extension components from conventional sound quality. In addition, a type of the packet of the encapsulated layer including this kind of media data is regarded as a packet type 7.

"Insert Position of Priority Value"

An example insert position of a priority value in the packet of the encapsulated layer is described. First, a case in which the packet of the encapsulated layer is a GSE packet is described.

FIG. 6(a) illustrates an example structure of a GSE packet. FIG. 6(b) illustrates contents of main items in the example structure. Field "S" indicates a start of a protocol data unit (PDU). Field "E" indicates an end of the PDU. Field "LT" indicates a label type. In the case of broadcasting, the field "LT" is '10'. A "GSE Length" field indicates a size of the GSE packet.

A "Fragment ID" field indicates a fragment ID. If the PDU is fragmented, divided packets in a PDU have the identical fragment ID. A "Total Length" field indicates a full length of the PDU. A "Protocol Type" field indicates the presence or absence of an extension header. Values of 1536 and above indicate type 2 to use an optional extension header. A "Label" field is not transmitted when the label type is '10'.

In the case of the GSE packet, the optional extension header is used to insert the priority value. FIG. 7 illustrates an example structure (Syntax) of the optional extension header to which the priority value is inserted. An 8-bit field "extension_header_type" indicates a type of the optional extension header. An 8-bit field "extension header_length" indicates a size of the optional extension header. The priority value is inserted into an 8-bit field "packet_priorities".

Next, a case in which the packet of the encapsulated layer is a TLV packet. FIG. 8 illustrates an example structure (syntax) of the TLV packet. A 32-bit TLV header (TLV header) includes a 2-bit field "01", a 6-bit field "packet_priorities", an 8-bit field "packet_type", and a 16-bit field "length". A priority value is inserted into the "packet_priorities" field.

By referring to FIG. 4 again, the framing unit 114 further performs framing processing to store each packet of the encapsulated layer in a slot of the transmission frame. The modulating/transmitting unit 115 performs RF modulation processing on the transmission frame to generate a broadcast wave which is sent to the receiving side through the RF transmission path. The modulating/transmitting unit 115, as used herein, modulates the packets of the encapsulated layer using one or a plurality of modulation methods.

For example, only modulation method 1 is adopted when modulation is performed using one modulation method, while modulation methods 1 and 2 are adopted when modulation is performed using a plurality of modulation methods. Radio waves reach different ranges depending on the modulation system. In FIG. 9(a), reach area 1 indicates a reach area of the modulation method 1, while reach area 2 indicates a reach area of the modulation method 2.

In transmission systems, a concept called physical layer pipes (PLP) is known. PLPs are grouped according to transmission parameters, such as the modulation system, encoding ratio, and the like. Transmission parameters can be set independently for each PLP. The example in which only the modulation method 1 is adopted is also an example of the transmission in which one PLP is used for transmission, as illustrated in FIG. 9(b). The example adopting the modulation methods 1 and 2 is also an example in which the transmission is performed with two PLPs, as illustrated in FIG. 9(c). When the modulation methods 1 and 2 are adopted, the packets of the encapsulated layer that have been modulated by the individual modulation methods are transmitted in a time-division manner.

The modulation method 1, as used herein, is a modulation method for mobile transmission. That is, a modulation method, such as 256QAM, having strong error resistance and capable of long-distance robust transmission. The modulation method 2 is a modulation method for stationary receivers. That is, a modulation method, such as 1024QAM, having error resistance not stronger than the modulation method 1, but capable of higher bit rates.

In FIG. 10, example combinations of types of packets to be transmitted are indicated by "c1" to "c6". In this drawing, "Pt1" to "Pt7" respectively correspond to "Packet type1" to "Packet type7" in FIG. 5. In the combination "c1", the packets of the encapsulated layer having the packet types 1 and 2 are transmitted in a time-division manner. Further, in the combination "c2", the packets of the encapsulated layer having the packet types 1 and 3 are transmitted in a time-division manner.

Further, in the combination "c3", the packets of the encapsulated layer having the packet types 1 and 4 are transmitted in a time-division manner. Further, in the combinations "c4" and "c5", the packets of the encapsulated layer having the packet types 1, 5, and 6 are transmitted in a time-division manner. Further, in the combination "c6", the packet of the encapsulated layer having the packet types 1, 6, and 7 are transmitted in a time-division manner.

When only the modulation method 1 is adopted as the modulation method, all packets to be transmitted in the encapsulated layer are modulated by the modulation method 1 in the combinations "c1" to "c6". On the other hand, when the modulation methods 1 and 2 are adopted, the packets of the encapsulated layer having certain packet types in the combinations "c1" to "c6" are modulated by the modulation method 1, and the rest of the packets of the encapsulated layer are modulated by the modulation method 2. In this case, different kinds of media data are included in the packets of the encapsulated layer modulated by the modulation methods 1 and 2.

For example, in the combination "c1" illustrated in FIG. 10, the packets of the encapsulated layer having the packet type 1 are modulated by the modulation method 1, while the packets of the encapsulated layer having the packet type 2 are modulated by the modulation method 2. Further, in the combination "c2", the packets of the encapsulated layer having the packet type 1 are modulated by the modulation method 1, while the packets of the encapsulated layer having the packet type 3 are modulated by the modulation method 2. Further, in the combination "c3", the packets of the encapsulated layer having the packet type 1 are modulated by the modulation method 1, while the packets of the encapsulated layer having the packet type 4 are modulated by the modulation method 2.

Further, in the combination "c4", the packets of the encapsulated layer having the packet type 1 are modulated by the modulation method 1, while the packets of the encapsulated layer having the packet types 4, 5 are modulated by the modulation method 2. Further, in the combination "c5" which is the combination of the same types of packets of the encapsulated layer as the combination "c4", the packets of the encapsulated layer having the packet types 1 and 6 are modulated by the modulation method 1, while the packets of the encapsulated layer having the packet type 5 are modulated by the modulation method 2. Further, in the combination "c6", the packets of the encapsulated layer having the packet types 1 and 6 are modulated by the modulation method 1, while the packets of the encapsulated layer having the packet type 7 are modulated by the modulation method 2.

Operation of the transmitting apparatus 100 illustrated in FIG. 4 is briefly described. Media data such as video or audio data is supplied to the encoder 112. The encoder 112 encodes the media data to obtain encoded data. The encoded data is supplied to the container generator 113. The container generator 113 packetizes the encoded data to generate multiplexed transport packets for each media in the container layer.

The multiplexed transport packets generated by the container generator 113 are supplied to the framing unit 114. The framing unit 114 generates IP packets each including the multiplexed transport packet, and further encapsulates the IP packets to generate the packets of the encapsulated layer, such as the GSE or TLV packets.

At this time, the packets of the encapsulated layer having the packet types to be transmitted among the packet types 1 to 7 illustrated in FIG. 5 are generated as the packets of the encapsulated layer. For example, in the case of the combination "c1" of FIG. 10, the packets of the encapsulated layer having the packet types 1 and 2 are generated in a time-division manner. Further, in the case of the combination "c4" of FIG. 10, for example, the packets of the encapsulated layer having the packet types 1, 5, and 6 are generated in a time division manner.

When the packets of the encapsulated layer are thus generated, the framing unit 114 inserts the identification information representing the kind of media data included in each packet of the encapsulated layer and, therefore, representing the priority value indicating the packet type (see FIGS. 7 and 8).

Further, the framing unit 114 performs framing processing to store the packets of the encapsulated layer in the slots of the transmission frame. The modulating/transmitting unit 115 performs the RF modulation processing on the transmission frames generated by the framing unit 114 to generate the broadcast wave which is then sent to the receiving side through the RF transmission path. As used herein, the modulating/transmitting unit 115 modulates the individual packets of the encapsulated layer only by the modulation method 1, or by the modulation methods 1 and 2, as illustrated in FIG. 10.

[Example Configuration of Receiving Apparatus]

Figure 11:
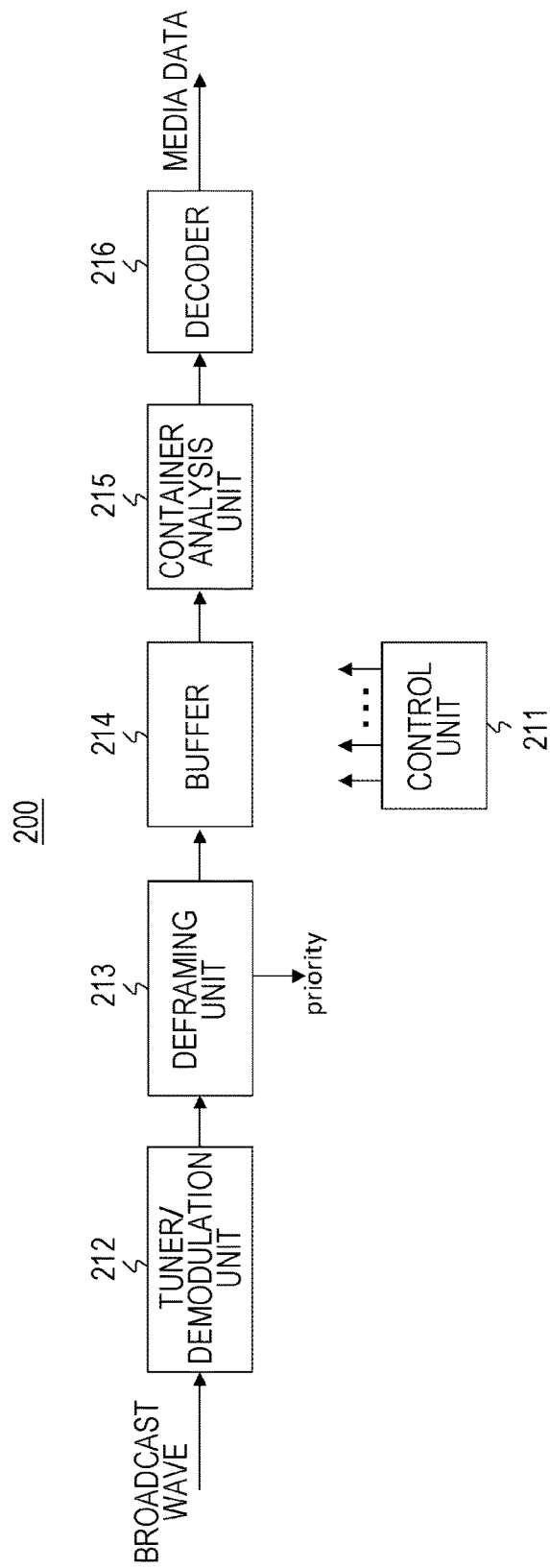
FIG. 11 is a block diagram of an example configuration of a receiving apparatus.

FIG. 11 illustrates an example configuration of the receiving apparatus 200. The receiving apparatus 200 includes a control unit 211, a tuner/demodulation unit 212, a deframing unit 213, a buffer 214, a container analysis unit 215, and a decoder 216. The control unit 211 controls operation of constituent components of the receiving apparatus 200.

The tuner/demodulation unit 212 receives the broadcast wave through the RF transmission path, and further performs demodulation processing to obtain the transmission frame including the packets of the encapsulated layer in the transmission slot. As described herein, in a case in which the individual packets of the encapsulated layer have been modulated using only the modulation method 1, all packets of the encapsulated layer are effective so long as the tuner/demodulation unit 212 corresponds to the modulation method 1.

Meanwhile, in a case in which the individual packets of the encapsulated layer have been modulated using the modulation methods 1 and 2, only the packets of the encapsulated layer that have been modulated by the modulation method 1 is effective if, for example, the receiving apparatus 200 is a mobile apparatus that corresponds to only the modulation method 1. Further, if the receiving apparatus 200 is a stationary receiver that corresponds to both the modulation methods 1 and 2 in this case, all packets of the encapsulated layer are effective.

The deframing unit 213 takes out effective packets of the encapsulated layer included in each slot of the transmission frame, and performs decapsulating processing to obtain the IP packets. At this time, the deframing unit 213 extracts, from the packets of the encapsulated layer, the kind of media data included in each packet of the encapsulated layer and, therefore, extracts the priority value as the identification information representing the packet type which is then sent to the control unit 211.

The control unit 211 recognizes the kind of media data included in the packets of the encapsulated layer and, therefore, recognizes the packet type in accordance with the priority value. The control unit 211 stores the IP packet in the buffer 214, the IP packet having been obtained from the packet of the encapsulated layer including the desired kind of media data among the packets of the encapsulated layer taken out by the deframing unit 213.

For example, a case considered below is a case in which the packet type combination transmitted from the transmitting apparatus 100 is "c1" in FIG. 10 so that the packets of the encapsulated layer having the packet type 1 (Pt1) and the packet type 2 (Pt2) are transmitted in a time-division manner.

In this case, the packets of the encapsulated layer having the packet type 1 (Pt1) include the video data 1 (Video1) having the HD resolution and the audio data 1 (Audio1) having the conventional sound quality, as illustrated in FIG. 5. Further, the packets of the encapsulated layer having the packet type 2 (Pt2) include the video data 2 (Video2) having the UHD resolution and the audio data 2 (Audio2) having the high sound quality, as illustrated in FIG. 5.

A first case described below is a case in which these packets of the encapsulated layer have been transmitted after modulation by only the modulation method 1.

Figure 12:
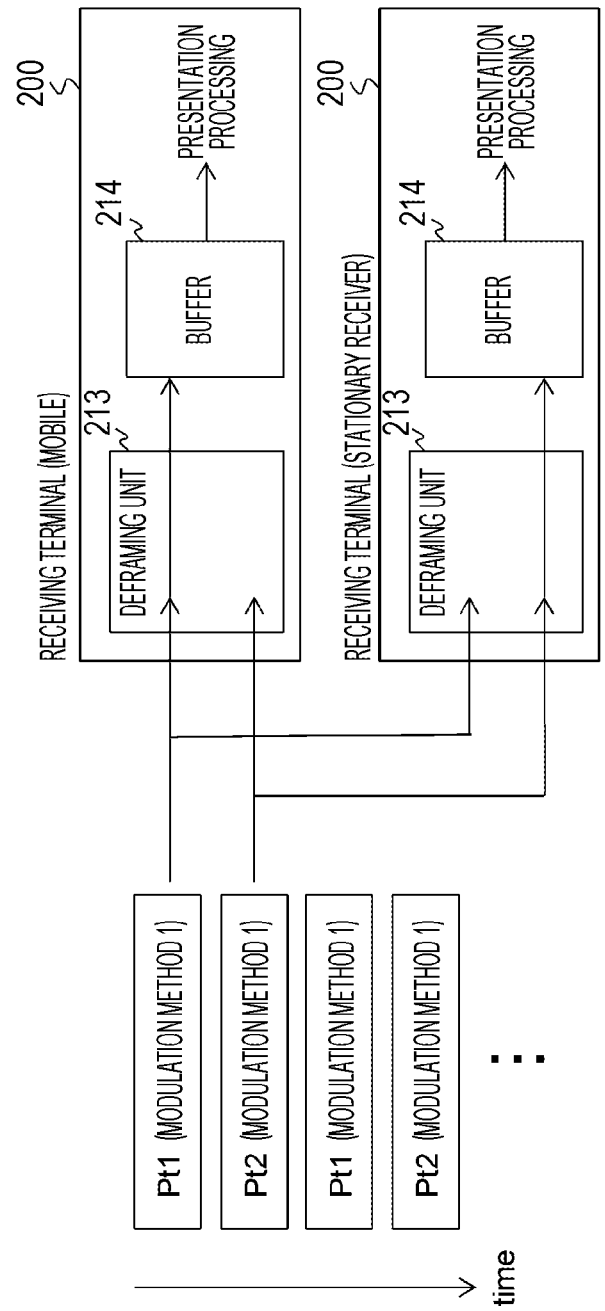
FIG. 12 is an explanatory view for explaining an example of packet selective operation in a receiving terminal (combination: c1, modulation method: 1).

When the receiving apparatus 200 is a mobile apparatus (which corresponds to only the modulation method 1), the deframing unit 213 takes out the packets of the encapsulated layer having both the packet type 1 (Pt1) and the packet type 2 (Pt2) as effective packets of the encapsulated layer, as illustrated in FIG. 12. The control unit 211, then, performs control so that only the packet of the encapsulated layer having the packet type 1 (Pt1) is selected and the IP packet included in packet of the encapsulated layer is stored in the buffer 214 and used for presentation processing.

Meanwhile, when the receiving apparatus 200 is a stationary receiver (which corresponds to the modulation methods 1 and 2), the deframing unit 213 takes out the packets of the encapsulated layer having both the packet type 1 (Pt1) and the packet type 2 (Pt2) as effective packets of the encapsulated layer, as illustrated in FIG. 12. The control unit 211, then, performs control so that only the packet of the encapsulated layer having the packet type 2 (Pt2) is selected and the IP packet included in the packets of the encapsulated layer is stored in the buffer 214 and used for presentation processing.

Next case described below is a case in which the packets of the encapsulated layer having the packet type 1 have been transmitted after the modulation by the modulation method 1, while the packets of the encapsulated layer having the packet type 2 have been transmitted after the modulation by the modulation method 2.

When the receiving apparatus 200 is a mobile apparatus (which corresponds to only the modulation method 1), the deframing unit 213 takes out only the packet of the encapsulated layer having the packet type 1 (Pt1) as effective packet of the encapsulated layer, as illustrated in FIG. 13. The control unit 211, then, performs control so that only the packet of the encapsulated layer having the packet type 1 (Pt1) is selected and the IP packet included in the packet of the encapsulated layer is stored in the buffer 214 and used for presentation processing.

Meanwhile, when the receiving apparatus 200 is a stationary receiver (which corresponds to the modulation methods 1 and 2), the deframing unit 213 takes out the packets of the encapsulated layer having both the packet type 1 (Pt1) and the packet type 2 (Pt2) as effective packets of the encapsulated layer, as illustrated in FIG. 13. The control unit 211, then, performs control so that only the packet of the encapsulated layer having the packet type 2 (Pt2) is selected and the IP packet included in the packets of the encapsulated layer is stored in the buffer 214 and used for presentation processing.

Further, a case considered below is, for example, a case in which the packet type combination transmitted from the transmitting apparatus 100 is "c3" in FIG. 10 so that the packets of the encapsulated layer having the packet type 1 (Pt1) and the packet type 4 (Pt4) are transmitted in a time-division manner.

In this case, the packets of the encapsulated layer having the packet type 1 (Pt1) include the video data 1 (Video1) having the HD resolution and the audio data 1 (Audio1) having the conventional sound quality, as illustrated in FIG. 5. Further, the packets of the encapsulated layer having the packet type 4 (Pt4) include the video data 3 (Video3) having the HD scalable extension components and the audio data 3 (Audio3) having the scalable extension components from the conventional sound quality, as illustrated in FIG. 5.

A first case described below is a case in which these packets of the encapsulated layer have been transmitted after modulation by only the modulation method 1.

When the receiving apparatus 200 is a mobile apparatus (which corresponds to only the modulation method 1), the deframing unit 213 takes out the packets of the encapsulated layer having both the packet type 1 (Pt1) and the packet type 4 (Pt4) as effective packets of the encapsulated layer, as illustrated in FIG. 14. The control unit 211, then, performs control so that only the packet of the encapsulated layer having the packet type 1 (Pt1) is selected and the IP packet included in packet of the encapsulated layer is stored in the buffer 214 and used for presentation processing.

Further, when the receiving apparatus 200 is a stationary receiver (which corresponds to the modulation methods 1 and 2), the deframing unit 213 takes out the packets of the encapsulated layer having both the packet type 1 (Pt1) and the packet type 4 (Pt4) as effective packets of the encapsulated layer, as illustrated in FIG. 14. The control unit 211, then, performs control so that both the packets of the encapsulated layer having the packet type 1 (Pt1) and the packet type 4 (Pt4) are selected and the IP packet included in the packet of the encapsulated layer is stored in the buffer 214 and used for presentation processing.

Next case described below is a case in which the packets of the encapsulated layer having the packet type 1 have been transmitted after modulation by the modulation method 1, while the packets of the encapsulated layer having the packet type 4 have been transmitted after modulation by the modulation method 2.

When the receiving apparatus 200 is a mobile apparatus (which corresponds to only the modulation method 1), the deframing unit 213 takes out only the packet of the encapsulated layer having the packet type 1 (Pt1) as effective packets of the encapsulated layer, as illustrated in FIG. 15. The control unit 211, then, performs control so that only the packet of the encapsulated layer having the packet type 1 (Pt1) is selected and the IP packet included in the packet of the encapsulated layer is stored in the buffer 214 and used for presentation processing.

Further, when the receiving apparatus 200 is a stationary receiver (which corresponds to the modulation methods 1 and 2), the deframing unit 213 takes out the packets of the encapsulated layer having both the packet type 1 (Pt1) and the packet type 4 (Pt4) as effective packets of the encapsulated layer, as illustrated in FIG. 15. The control unit 211, then, performs control so that both the packets of the encapsulated layer having the packet type 1 (Pt1) and the packet type 4 (Pt4) are selected and the IP packet included in the packet of the encapsulated layer is stored in the buffer 214 and used for presentation processing.

It is noted that, although detailed description will not be given, similar packet selecting operations are performed in other examples of packet type combinations according to whether the receiving terminal 200 is mobile or stationary receiver, and whether the packets of the encapsulated layer are modulated using only the modulation method 1 or using both the modulation methods 1 and 2.

Referring to FIG. 11 again, the container analysis unit 215 extracts the encoded data for each type of data included in the payload from the IP packet stored in the buffer 214. The decoder 216 performs decoding processing of the encoded data for each kind of data to obtain media data, such as video data or audio data.

For example, a case described below is a case in which the combination of packet types transmitted from the transmitting apparatus 100 is "c1" of FIG. 10. In this case, when the receiving apparatus 200 is a mobile apparatus, the decoder 216 provides the video data 1 (Video1) having the HD resolution and the audio data 1 (Audio1) having the conventional sound quality. Further, when the receiving apparatus 200 is a stationary receiver in this case, the decoder 216 provides the video data 2 (Video2) having the UHD resolution and the audio data 2 (Audio2) having the high sound quality.

Also, a case described below is a case in which, for example, the combination of packet types transmitted from the transmitting apparatus 100 is "c3" of FIG. 10. In this case, when the receiving apparatus 200 is a mobile apparatus, the decoder 216 provides the video data 1 (Video1) having the HD resolution and the audio data 1 (Audio1) having the conventional sound quality.

Further, when the receiving apparatus 200 is a stationary receiver in this case, the decoder 216 provides the video data 1 (Video1) having the HD resolution, the audio data 1 (Audio1) having the conventional sound quality, and further provides the video data 3 (Video3) having the HD scalable extension components and the audio data 3 (Audio3) having the scalable extension components from the conventional sound quality.

It is noted that a presentation processing unit is provided, although not illustrated, following the decoder 216 to perform presentation of images and voice in accordance with the media data obtained from the decoder 216.

Operation of the receiving apparatus 200 illustrated in FIG. 11 is briefly described. The tuner/demodulation unit 212 receives the broadcast wave through the RF transmission path and performs RF demodulation processing to obtain transmission frames including the packets of the encapsulated layer in the transmission slots. The transmission frames are supplied to the deframing unit 213.

The deframing unit 213 takes out effective packets of the encapsulated layer included in the slots of the transmission frame, and performs decapsulating processing to obtain the IP packets. As used herein, the effective packets of the encapsulated layer indicate the packets of the encapsulated layer that have been properly demodulated.

Further, the deframing unit 213 extracts the priority value from the packets of the encapsulated layer as the identification information representing the kind of media data included in the packets of the encapsulated layer and, therefore, representing the packet type, and sends the extracted priority values to the control unit 211.

The control unit 211 recognizes the kind of media data included in the packets of the encapsulated layer and, therefore, recognizes the packet type in accordance with the priority values. The control unit 211, then, controls storage of the IP packets in the buffer 214. In this case, the buffer 214 only stores the IP packets that have been obtained from the packets of the encapsulated layer including the desired kind of media data among the packets of the encapsulated layer taken out by the deframing unit 213.

The container analysis unit 215 extracts the encoded data for each type of data included in the payload from the IP packets stored in the buffer 214. The extracted encoded data is supplied to the decoder 216. The decoder 216 performs decoding processing of the encoded data for each kind of data to obtain media data, such as video or audio data. The media data then presents images and voice.

As described above, on the transmitting side of the transmission and reception system 10 illustrated in FIG. 1, the priority value is inserted into the packet (transmission packet) of the encapsulated layer as the identification information representing the kind of media data and, therefore, representing the packet type included in the packet of the encapsulated layer. Thus, the packet of the encapsulated layer that includes the desired media data can be recognized easily on the receiving side, and selective processing of media data is facilitated.

Further, on the receiving side of the transmission and reception system 10 illustrated in FIG. 1, the buffer 214 selectively stores only the IP packet related to the desired media data in accordance with the priority value inserted into the packet of the encapsulated layer as the identification information representing the kind of media data and, therefore, representing the packet type of the packet of the encapsulated layer. It is not necessary, therefore, for the buffer 214 to keep data that is unrelated to the presentation processing, and the buffer 214 is allowed to have a minimum capacity required.

Further, the transmitting side of the transmission and reception system 10 illustrated in FIG. 1 is able to modulate the packets of the encapsulated layer using a plurality of modulation methods. Thus, the modulation methods can be selectively changed according to the kind of media data included in the packet of the encapsulated layer.

For example, the packet of the encapsulated layer including the media data to be received by the mobile apparatus can be modulated by the modulation method having strong error resistance and capable of long-distance robust transmission. On the other hand, the packet of the encapsulated layer that includes the media data to be received only by the stationary receiver can be modulated by the modulation method having the error resistance which is not strong enough and capable of achieving higher bit rates.

By thus changing the modulation method, the mobile apparatus, for example, can only obtain the packets of the encapsulated layer that include the media data to be received as the effective packets of the encapsulated layer, thus decreasing processing loads of subsequent processing.

2. Modification

It is noted that, in the above-described embodiment, the example of using the GSE packet or the TLV packet has been described as the packet of the encapsulated layer in broadcasting. However, the present technology does not limit the packet of the encapsulated layer to these two types of packets, and may use other types of packets capable of executing a similar function.

Further, the present technology can also be configured in the following manner.

(1) A transmitting apparatus including a transmitting unit that transmits a transmission stream in which transmission packets are consecutively disposed, each transmission packet including a multiplexed transport packet having media data in an upper layer, and an information inserting unit that inserts identification information into the transmission packet, the identification information representing a kind of the media data included in the transmission packet.

(2) The transmitting apparatus as recited in (1) above in which the transmitting unit transmits the transmission packets that have been consecutively disposed by modulating the transmission packets using a plurality of modulation methods.

(3) The transmitting apparatus as recited in (2) above in which different kinds of the media data are included in the transmission packets modulated by different modulation methods.

(4) The transmitting apparatus as recited in any one of (1) to (3) above in which the transmission packet is a packet of an encapsulated layer obtained by encapsulating an IP packet including the multiplexed transport packet in payload.

(5) The transmitting apparatus as recited in (4) above in which the transmission packet is a GSE packet or a TLV packet.

(6) A transmitting method including a transmitting step of transmitting a transmission stream in which transmission packets are consecutively disposed, each transmission packet including a multiplexed transport packet having media data in an upper layer, and an information inserting step of inserting identification information into the transmission packet, the identification information representing a kind of the media data included in the transmission packet.

(7) A receiving apparatus including a receiving unit that receives a transmission stream in which transmission packets are consecutively disposed, each transmission packet including a multiplexed transport packet having media data in an upper layer, in which the transmission packet includes identification information inserted into the transmission packet, the identification information representing a kind of the media data, and the receiving apparatus further includes a processing unit that processes the transmission stream in accordance with the identification information when the transmission stream is received.

(8) The receiving apparatus as recited in (7) above, in which the processing unit selectively takes in and processes, in a buffer, payload data of the transmission packet into which the identification information representing a desired kind of the media data is inserted among the transmission packets included in the received transmission stream.

(9) The receiving apparatus as recited in (7) or (8) above, in which the transmission packet is a packet of the encapsulated layer obtained by encapsulating an IP packet including the multiplexed transport packet in payload.

(10) The receiving apparatus as recited in (9) above, in which the transmission packet is a generic stream encapsulation (GSE) packet or a type-length-value (TLV) packet.

(11) A receiving method including a receiving step of receiving, by a receiving unit, a transmission stream in which transmission packets are consecutively disposed, each transmission packet including a multiplexed transport packet having media data in an upper layer, in which the transmission packet includes identification information inserted into the transmission packet, the identification information representing a kind of the media data, and the receiving method further includes a processing step of processing the transmission stream in accordance with the identification information when the transmission stream is received.

A main characteristic of the present technology is inserting the priority data value, as identification information representing a kind of media data and, therefore, a packet type of the packet of the encapsulated layer, in order to facilitate recognition of the packets of the encapsulated layer including the desired media data on the receiving side (see FIGS. 4, 7, and 8).

REFERENCE SIGNS LIST

10 Transmission and Reception System
100 Transmitting apparatus
111 Control unit
112 Encoder
113 Container generator
114 Framing unit
115 Modulating/transmitting unit
200 Receiving apparatus
211 Control unit
212 Tuner/demodulation unit
213 Deframing unit
214 Buffer
215 Container analysis unit
216 Decoder

The invention claimed is:

1. A transmitting apparatus, comprising:
a transmitter configured to transmit a transmission stream in which transmission packets are consecutively disposed, each transmission packet including a multiplexed transport packet having media data in an upper layer; and
a controller configured to insert identification information into a lower layer of each transmission packet, the identification information identifying a kind of media data included in the multiplexed transport packet of the respective transmission packet,
wherein the kind of the media data includes one of audio data of different qualities, video data of different resolutions, or combinations of video and audio data of different resolutions and qualities, and
wherein the controller is configured to select one of a plurality of different modulation methods for transmission of a transmission packet based on the kind of the media data identified by the identification information in the lower layer of the transmission packet.

2. The transmitting apparatus according to claim 1, wherein
the transmitter selectively assigns each of different kinds of media data to a corresponding one of the plurality of different modulation methods,
wherein
the transmitter transmits the transmission packets that have been consecutively disposed by modulating the transmission packets using one or more of the plurality of different modulation methods.

3. The transmitting apparatus according to claim 2, wherein
the media data included in the multiplexed transport packets are modulated by changing to a different modulation method according to the kind of the media data included in the respective multiplexed transport packet,
wherein the kind of the media data is media data that can be reproduced by a respective kind of receiving device.

4. The transmitting apparatus according to claim 3, wherein the kind of the media data includes one of High Definition (HD) video and average audio, ultra-high definition video and greater than average quality audio, scalable extension component of HD and greater than average quality audio, scalable extension component of HD, greater than average quality audio, and scalable extension component.

5. The transmitting apparatus according to claim 1, wherein
each transmission packet is a packet of an encapsulated layer obtained by encapsulating an IP packet including the multiplexed transport packet in payload.

6. The transmitting apparatus according to claim 5, wherein
each transmission packet is a GSE packet or a TLV packet.

7. A transmitting method, comprising:
transmitting a transmission stream in which transmission packets are consecutively disposed, each transmission packet including a multiplexed transport packet having media data in an upper layer; and
inserting identification information into a lower layer of each transmission packet, the identification information identifying a kind of media data included in the multiplexed transport packet of the respective transmission packet,
wherein the kind of the media data includes one of audio data of different qualities, video data of different resolutions, or combinations of video and audio data of different resolutions and qualities, and
the method further comprising selecting one of a plurality of different modulation methods for transmission of a transmission packet based on the kind of the media data identified by the identification information in the lower layer of the transmission packet.

8. A receiving apparatus, comprising:
a receiver configured to receive a transmission stream in which transmission packets are consecutively disposed, each transmission packet including a multiplexed transport packet having media data in an upper layer, wherein at least one kind of the media data among different kinds of the media data are received using one or more of a plurality of different modulation methods, the one or more modulation methods being selected based on the kind of the media data included in a transmission packet and identified by identification information in a lower layer of the transmission packet,
wherein
the receiving apparatus further comprises:
a controller configured to process the transmission stream by selecting for a given modulation method one kind of media data among the different kinds in accordance with the identification information among the transmission packets when the transmission stream is received,
wherein the kind of the media data includes one of audio data of different qualities, video data of different resolutions, or combinations of video and audio data of different resolutions and qualities.

9. The receiving apparatus according to claim 8, wherein
the controller selectively takes in and processes, in a buffer, payload data of each transmission packet into which the identification information identifying the selected one kind of the media data is inserted among the transmission packets included in the received transmission stream.

10. The receiving apparatus according to claim 8, wherein
each transmission packet is a packet of an encapsulated layer obtained by encapsulating an IP packet including the multiplexed transport packet in payload.

11. The receiving apparatus according to claim wherein
each transmission packet is a GSE packet or a TLV packet.

12. The receiving apparatus of claim 8, wherein the kind of the media data depends on a kind of the receiving apparatus.

13. The receiving apparatus of claim 12, wherein the kind of receiving apparatus is a mobile apparatus and the kind of the media data is a kind that can be reproduced by the mobile apparatus.

14. The receiving apparatus of claim 12, wherein the kind of the receiving apparatus is a stationary receiver and the kind of the media data is a kind that can be reproduced by the stationary receiver.

15. A receiving method, comprising:
receiving, by a receiving unit, a transmission stream in which transmission packets are consecutively disposed, each transmission packet including a multiplexed transport packet having media data in an upper layer, wherein at least one kind of the media data among different kinds of the media data are received using one or more of a plurality of different modulation methods, the one or more modulation methods being selected based on the kind of the media data included in a transmission packet and identified by identification information in a lower layer of the transmission packet,
wherein
the receiving method further comprises:
processing the transmission stream by selecting for a given modulation method one kind of media data among the different kinds in accordance with the identification information among the transmission packets when the transmission stream is received,
wherein the kind of the media data includes one of audio data of different qualities, video data of different resolutions, or combinations of video and audio data of different resolutions and qualities.

* * * * *